Jan. 17, 1967   P. J. ENYEART   3,298,140
TOOL FIXTURE
Filed May 20, 1964

INVENTOR.
PAUL J. ENYEART
BY Wason, Kolehmainen,
Rathburn & Wyss.
ATTORNEYS

United States Patent Office 3,298,140
Patented Jan. 17, 1967

3,298,140
TOOL FIXTURE
Paul J. Enyeart, Fort Wayne, Ind., assignor to Joslyn Mfg. and Supply Co., Chicago, Ill., a corporation of Illinois
Filed May 20, 1964, Ser. No. 368,827
4 Claims. (Cl. 51—103)

The present invention relates to an improvement in machine tool fixtures useful in machines requiring a supporting blade or base for the work piece, and, in particularly described embodiments, to a centerless grinder set-up assembly and to an improved work rest for a centerless grinder.

Commercial centerless grinders operate on the principle that the part being processed is passed between a grinding wheel revolving at a high speed and a regulating or control wheel revolving at a low speed over a work support or rest. It is common in manufacturing production lines to have a centerless grinder as one machine in a machine conveyor line so that material to be processed moves generally continuously to the centerless grinder by suitable conveyor means, is processed, and is then transferred from the centerless grinder by suitable conveyor means. It is important that down-time or set-up time of the centerless grinder is held to a minimum.

Accordingly, it is an object of the present invention to provide an improved centerless grinder set-up assembly wherein down-time of the machine tool for replacement of the work rest or support, and set-up time of the machine tool for changing to different sizes of processed material, is held to a minimum.

Yet a further object of the present invention is to provide an improved work rest for a centerless grinder wherein the down-time for replacement of the work rest, and the set-up time for changing the machine to various size materials is held to a minimum.

A further object of the present invention is to provide a new and improved centerless grinder set-up assembly.

Yet a further object of the present invention is to provide a new and improved work rest for a centerless grinding machine or similar machine tool.

Further objects and advantages of the present invention will become apparent as the following description proceeds and the features of novelty which characterize the invention will be pointed out with particularity in the claims annexed and forming a part of the specification.

In accordance with these and many other objects of the present invention, there is provided a new and improved work rest, and a new and improved centerless grinder setup assembly. The improved centerless grinder setup, according to the present invention, includes a centerless grinding machine tool of the type having a grinding wheel, a regulating wheel, and means for moving the wheels toward and away from each other to accurately adjust the spacing of the wheels to provide for a selected diameter of work piece to be ground. A new and improved work rest is provided and is clamped to the machine for supporting the work material between the wheels. The work rest includes a work support base blade having longitudinally-spaced, vertically-extending, end block of rectangular cross-section interconnected by a web. The web is of reduced thickness relative to the end block and tapers outwardly and downwardly to approximately the thickness of the end block. The base blade is provided with spaced hardened pins projecting from the top of the base blade adjacent the respective ends thereof. Interchangeable top blades having spaced end blocks of similar cross-section as those in the base blade, and interconnected by a web of reduced diameter, is provided for supporting the work piece. The end blocks of the top blade are provided with holes aligned to receive the pins to provide for assembly of the top blade with the base blade.

The quick-change, work-support blade according to the present invention minimizes down-time and setup time for blade replacement in the centerless grinder. The top blade has a height and width relative to the size of the bar being ground. For example, a .125" thick x .875" high blade used for grinding a 5/16" diameter stock would have approximately the same pass lines as a .375" thick x .750" high blade used in grinding 7/16" diameter stock. Moreover, the method of securing the top blade to the base blade is simple and effective. The two hardened pins which project from the top of the base blade near each end are aligned with drilled and reamed openings in the top work blade to match the pin. Thus the top work blade can be snapped in place in a few seconds. Furthermore, the top work blades can be turned over and used on the other side. Changing sizes of the work blade to accommodate the different size stock material is quite simple because very little height changes are ever required on the base blades. Using the method according to the present invention, the time required to change blade is reduced from between 15 to 20 minutes to between 1 to 3 minutes.

The drilled and reamed holes and the hardened pins of the fixture are offset from the pass line or centerline of the top blade away from the grinding wheel. In this manner the downward thrust of the grinding wheel will wedge the top blade against the pins thus preventing chatter.

For a better understanding of the present invention reference may be had to the accompanying drawings wherein.

Figure 2:
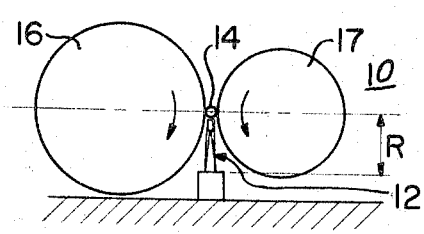
FIGURE 2 is a schematic illustration of the grinding and regulating wheel and work held on the work rest according to the present invention.

Referring now to the drawings, there is illustrated a centerless grinder setup assembly according to the present invention, and including a centerless grinding machine 10, and an improved work support or rest 12 according to the present invention which supports stock or work material 14 being ground. The grinding machine 10 includes a driven grinding wheel 16 and a driven regulating wheel 17 in spaced relation thereto. As illustrated in FIGURE 2, the grinding wheel 16 and the regulating wheel 17 may be driven in opposite directions so that the stock material 14 supported approximately on a center line of the wheels is driven with a surface in the same direction as the grinding wheel 16, but at a slower speed than the grinding wheel 16. The regulating wheel 17 may be adjusted in spaced relation to the grinding wheel 16 by a quick hand adjusting wheel 18 in a known manner, and, additionally, may be accurately adjusted relative to the grinding wheel by a micrometer hand adjustment wheel 19. The work support or rest 12 is clamped or otherwise suitably secured to the centerless grinding machine 10.

Figure 1:
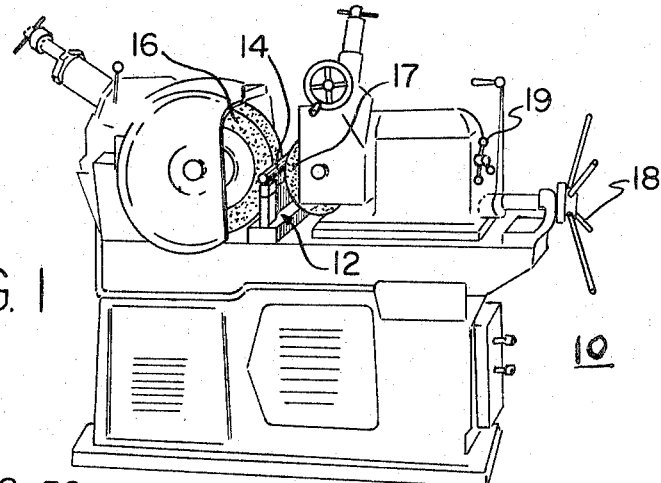
FIGURE 1 is an isometric view of a centerless grinder setup assembly according to the present invention and utilizing the improved work rest.
Figure 5:
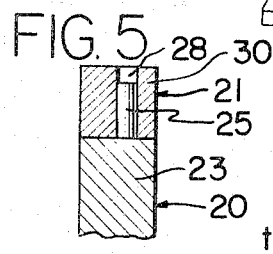
FIGURE 5 is a fragmentary sectional view through the projections in the work rest of FIGURE 4.
Figure 4:
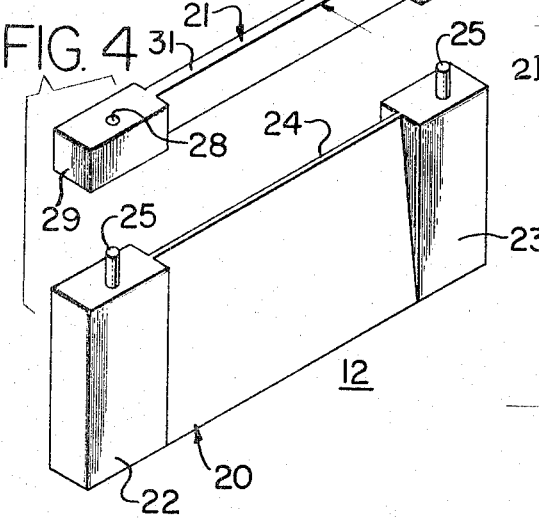
FIGURE 4 is an isometric view, in exploded form, of the improved work rest of FIGURE 3.
Figure 3:
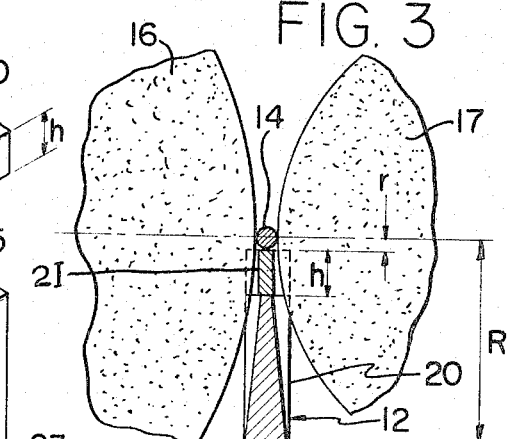
FIGURE 3 is a fragmentary front view of the centerless grinder setup assembly of FIGURE 1, drawn to a larger scale and illustrating in cross-section the improved work rest according to the present invention.

As best illustrated in FIGURES 3, 4 and 5, the work rest includes a work support base blade 20, best illustrated in FIGURE 4, and an interchangeable top blade 21 assembled therewith. The base blade 20 includes a pair of longitudinally spaced, vertically extending end sections of rectangular cross-section 22, 23, FIGURE 4, interconnected by a web 24 of reduced thickness at its top, and tapering outwardly and downwardly to the thickness of the end section adjacent to the bottom thereof. The base blade is provided with spaced hardened pins 25 projecting from the top of the base blade adjacent to respective ends thereof. To provide for quick changing of the machine setting, the top blade 21 is provided with drilled and reamed holes 28 extending through spaced end sections 29, 30. The end sections 29, 30 are interconnected by a web 31 of reduced cross-section. The thickness of the web 31 and the height of the top blade are determined by the diameter of the work material ground by the machine 10. As shown somewhat exaggerated in the embodiment of FIGURES 4 and 5, the pins 25 and the drilled and reamed holes 28 are preferably offset from the center line of the work rest 12.

Figure 6:
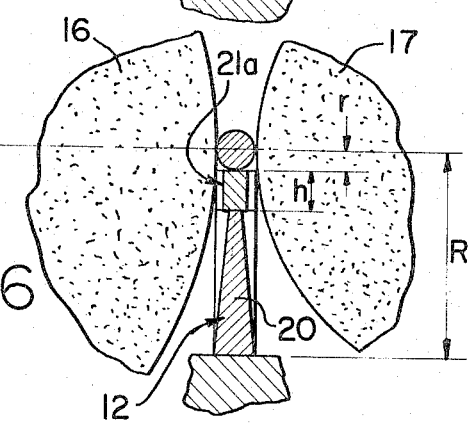
FIGURE 6 is a fragmentary front view of the centerless grinder setup assembly of FIGURE 1, illustrating a work piece adapted for supporting a stock material of a different diameter than that illustrated in FIGURES 1 to 5.

The center of the stock material 14 ground by the machine 10 is approximately on a line of centers of the grinding wheel 16 and the regulating wheel 17. More specifically, as illustrated in FIGURE 3, the center line of the work material 14 is at a distance R, FIGURE 3, above the reference table of the grinder 10. Accordingly, the top of the work rest 12 must necessarily be of a different height $h$ equal to the radius $r$ of the work piece below the center line of the work material. In order to maintain the work piece 14 at the desired level, a suitable top blade will be chosen within the height $h$ to provide a proper support. In the illustrated embodiment, for example, the top blade 21 may have a web thickness $t$ of .125" and a blade height $h$ of .875", and may be used for grinding work material with a finished diameter of $\frac{3}{16}$".

Where it is desired to grind stock of a different diameter, the top blade 21 will be removed, by the mere removal thereof from the pins 25, and a different top blade, 21a, FIGURE 6, will be installed on the base blade 20. As therein illustrated, for example, to provide for grinding material $\frac{7}{16}$" diameter finished stock, the top blade 21a may have a thickness $t$ of .375" and a height $h$ of .750".

It will be appreciated that the top blade 21 may be readily and quickly interchanged to provide for replacement of the top blade, and to alter the setup of the grinding machine, by the mere removal and replacement of the top blade on the base blade.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A centerless grinder setup assembly comprising a centerless grinding machine of the type having a grinding wheel, a regulating wheel, and means for moving said wheels toward and away from each other to accurately adjust the spacing of said wheels; and a work rest clamped to said machine for supporting work material between said wheels, said rest including a work support base blade having longitudinally-spaced, vertically-extending end sections of rectangular cross-section interconnected by a web, said web being of reduced thickness at the top and tapering outwardly and downwardly to the thickness of said end sections, spaced hardened pins projecting from the top of said base blade adjacent respective ends thereof, and an interchangeable top blade having spaced end sections of similar cross-section as the first-mentioned end sections and interconnected by a web, the last-mentioned end blocks being provided with holes aligned to receive said pins to provide for assembly of said top blade with said base blade, the thickness of the last-mentioned web and the height of said top blade being of a dimension determined by the diameter of work material ground by said machine.

2. A centerless grinder setup assembly comprising a centerless grinding machine of the type having a grinding wheel, a regulating wheel, and means for moving said wheels toward and away from each other to accurately adjust the spacing of said wheels; and a work rest clamped to said machine for supporting work material between said wheels, said rest including a work support base blade, spaced hardened pins projecting from the top of said base blade adjacent respective ends thereof, and an interchangeable top blade provided with holes aligned to receive said pins to provide for assembly of said top blade with said base blade, the height of said top blade being of a dimension determined by the diameter of work material ground by said machine.

3. A work rest adapted to be clamped to a centerless grinding machine for supporting work material at said machine, and comprising a work support base blade having longitudinally-spaced, vertically-extending end sections of rectangular cross-section interconnected by a web, said web being of reduced thickness at the top and tapering outwardly and downwardly to the thickness of said end sections, spaced hardened pins projecting from the top of said base blade adjacent respective ends thereof, and an interchangeable top blade having spaced end sections of similar cross-section as the first-mentioned end sections and interconnected by a web, the last-mentioned end sections being provided with holes aligned to receive said pins to provide for assembly of said top blade with said base blade, the thickness of the last-mentioned web and the height of said top blade being of a dimension determined by the diameter of work material ground by the machine.

4. A work rest adapted to be clamped to a centerless grinding machine for supporting work material at said machine, and comprising a work support base blade, spaced hardened pins projecting from the top of said base blade adjacent respective ends thereof, and an interchangeable top blade being provided with holes aligned to receive said pins to provide for assembly of said top blade with said base blade, the thickness of the last-mentioned web and the height of said top blade being of a dimension determined by the diameter of work material ground by the machine.

References Cited by the Examiner
UNITED STATES PATENTS

| | | | |
|---|---|---|---|
| 1,440,795 | 1/1923 | Reeves | 51—103 |
| 1,691,061 | 11/1928 | Heim | 51—103 X |
| 2,554,423 | 5/1951 | Smolich | 51—103 X |

LESTER M. SWINGLE, *Primary Examiner.*